US005467451A

United States Patent [19]
Burkis et al.

[11] Patent Number: 5,467,451
[45] Date of Patent: Nov. 14, 1995

[54] METHOD OF DISPLAYING A BOUNDING BOX USING A SET ASPECT RATIO AND THE COORDINATE RATIO OF A GRAPHICAL POINTER

[75] Inventors: Joseph J. Burkis, Chandler; Andrew H. Cowan, Gilbert; Martin F. Lutz, Mesa; Steven L. Crain, Chandler, all of Ariz.

[73] Assignee: Motorola, Inc., Schaumburg, Ill.

[21] Appl. No.: 394,053

[22] Filed: Feb. 24, 1995

Related U.S. Application Data

[63] Continuation-in-part of Ser. No. 925,135, Aug. 6, 1992, abandoned.

[51] Int. Cl.[6] .................................................... G06F 15/62
[52] U.S. Cl. .......................... 395/161; 395/133; 395/141; 395/155
[58] Field of Search ................................. 395/100, 133, 395/139, 155, 157, 159, 161, 118; 345/117, 119, 120; 364/900, 491

[56] References Cited

U.S. PATENT DOCUMENTS

| | | | |
|---|---|---|---|
| 4,555,775 | 11/1985 | Pike | 364/900 |
| 4,788,538 | 11/1988 | Klein et al. | 340/747 |
| 5,363,313 | 11/1994 | Lee | 364/491 |
| 5,396,590 | 3/1995 | Kreegar | 395/159 |

OTHER PUBLICATIONS

Dong et al; "Constrained Floorplan Design for Flexible Blocks"; Digest of Technical Papers (ICCAD-89), pp. 488–491.

Yi, Cheon Hee; "Area Optimization for VLSI by CAD", Journal of Korea Institute of Electronics Engineers, vol. 24 No. 4, pp. 161–165, 198T.

*MacDraw Pro User's Guide*, Claris, 1991, pp. [2–7], [2–8], [2–15], [2–50]–[2–55], [3–5], [3–6], [3–10]–[3–61], and [9–10], [9–11].

*Microsoft Windows Users Guide Version 30*, Microsoft Corporation 1985–1990, pp. 259–313.

R. L. Snapp, "Super Paint 1.1", Silicon Beach Software, 1988, pp. 25–26.

*Primary Examiner*—Mark R. Powell
*Assistant Examiner*—Robert Andrews
*Attorney, Agent, or Firm*—Lee Mah

[57] ABSTRACT

A method for defining an area of a computer screen (10). The defined area is specified as box (15) which the user may rigidly move vertically and horizontally and adjust both the width and height of the box (15). A single keystroke and motion of a mouse is sufficient to define the box (15), to resize the box (15) and to rigidly move the box (15).

6 Claims, 3 Drawing Sheets

METHOD OF DISPLAYING A BOUNDING BOX USING A SET ASPECT RATIO AND THE COORDINATE RATIO OF A GRAPHICAL POINTER

This application is a continuation-in-part of prior application Ser. No. 07/925,135, filed Aug. 6, 1992, now abandoned.

BACKGROUND OF THE INVENTION

The present invention relates, in general, to computer enhanced graphics and more particularly, to a method for selecting an area of a computer graphics screen.

One of the most fundamental operations of computer graphics is to select graphical objects to be worked on. Typically this area is defined as a rectilinear box that defines the area and selects objects within it in some way. The selection may be based on complete containment, partial containment, or contact between an object and the box. Another use for this box is to define a smaller region of the graphics screen to be displayed at a higher magnification. Typically a pointer controlled by an input means such as a mouse or stylus is caused to be moved about the screen under the control of the computer user. The box is defined by pressing a button which activates the input means. The cursor is then caused to move diagonally across the screen to define the area desired. A typical box selection method is described in "Superpaint 1.1" by R. L. Shnapp, published in 1988 by Silicon Beach Software, Inc., page 25 and 26. This example is used in a Macintosh computer system in which a mouse is used to move the cursor from one corner to the opposite corner of the desired area with the mouse button depressed. This causes a rectangle to be displayed which is continually resized to keep the second corner coincident with the cursor position. When the mouse button is released the boundary of the selected region is highlighted with a pattern of moving dashes. In this example, depressing keys on the computer keyboard will provide alternative methods for selection of shapes within the rectangle. This method for selection allows the user to readily adjust the width and height of the area, but does not allow the user to rigidly move the area horizontally or vertically.

The form of box definition used by the prior art is often awkward to use for defining the correct area of a graphical screen with a single action. If the first point is selected poorly, the selection process must be aborted to pick a different point. Typically once started the function that is invoked in this way is committed to completion before another box can be defined. Many such functions, such as completely resizing and redrawing the display screen may take many minutes or even hours to execute. However until the function finishes and the new information is shown on the display screen there is no reference by which to select a new box. Thus selection of the incorrect box can carry a severe penalty. With the increasing resolution and density of computer graphics displays picking the correct box on the first try becomes increasingly difficult.

There is a need for a method to define a resizable box on an area of a computer screen. The user must be able to move the defined area vertically and horizontally while simultaneously adjusting the width and the height. Since the select operation is one of the most frequently performed operations it is important that the operation be performed with a single keystroke.

DETAILED DESCRIPTION OF THE DRAWINGS

FIGS. 1–5 illustrate the operation of a preferred embodiment in accordance with the present invention.

Figure 1:
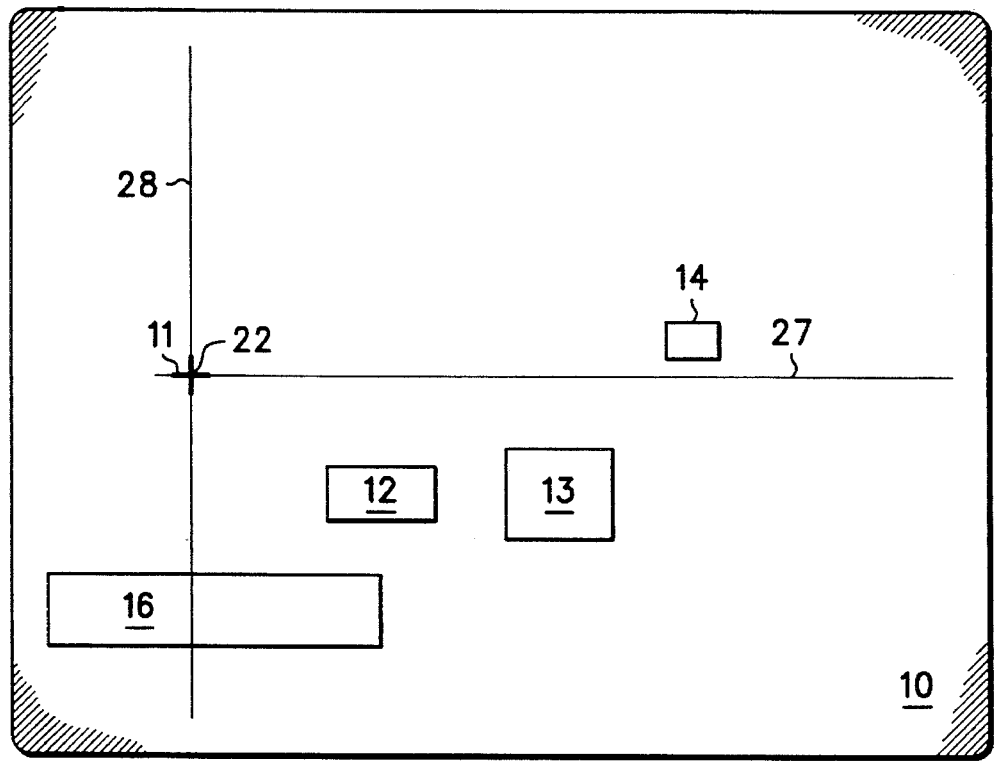
FIG. 1 shows a portion of a computer screen which is displaying a plurality of graphical objects.

FIG. 1 shows a computer screen 10 having a plurality of graphical objects 12, 13, 14 and 16 displayed on the computer screen. Graphical objects 12, 13, 14, and 16 are shapes drawn on computer screen 10 which represent the size and shape of physical objects such as parts within a design. In the preferred embodiment, graphical objects 12, 13, 14, and 16 summarize the physical outlines of a plurality of cells within an integrated circuit. In this example, a graphical pointer means 11 is shown as a thick cross which defines a desired point on computer screen 10. Graphical pointer means 11 is controlled by means of an input device such as a mouse, trackball, or coordinate pen. Graphical pointer means 11 is typically activated by a button. When graphical pointer means 11 is activated an initial point 22 is defined on the computer screen. For clarity a first axis, also called the x or horizontal axis, 27 and a second axis, also called the y or vertical axis, 28 are shown passing though initial point 22 although these axis lines would not normally be shown on a computer screen. The location of the initial point 22 is identified in the computer by coordinate point (X1, Y1). The location of the graphical pointer means at any instant is identified in the computer by coordinate point (Xp, Yp)

Figure 2:
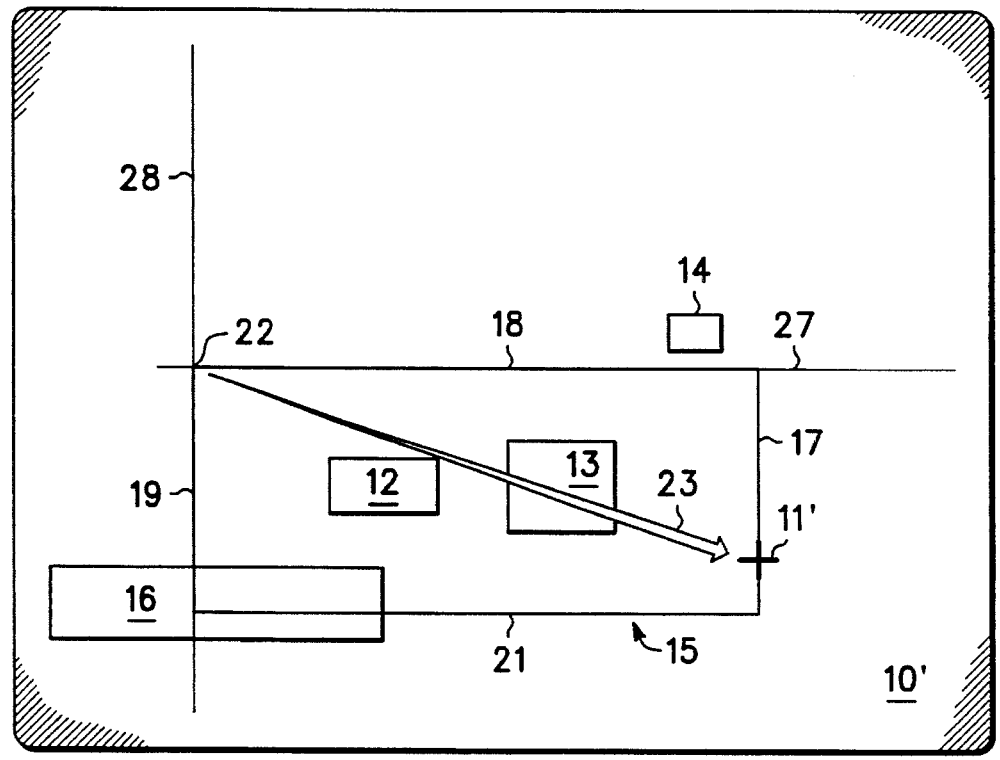
FIG. 2 shows the computer screen of FIG. 1 with a box defining an area of the computer screen.

FIG. 2 shows computer screen 10' after graphical pointer means 11 has been caused to move to become graphical pointer means 11'. An arrow 23 illustrates the motion of graphical pointer means 11. A rectangule 15 is defined by four edges: A first edge 18 coincident with first axis 27 tracks graphical pointer means 11' as it moves away from initial point. A second edge 19 is coincident with second axis 28, extending from the initial point where it meets the first edge 18 and also tracks the graphical pointer means. A third edge 17 is parallel to the second axis 28, meeting first edge 18 at the first axis and has the same dimension as the second edge 19. A fourth edge 21 has the same dimension as the first edge 18 and joins second edge 19 to third edge 17 to complete the rectangule 15. However, before moving the pointer means from location 11 to location 11', a constant K is entered into the computer to preset the aspect ratio of the rectangle to be drawn with the graphical pointer means. The ratio of the x dimension of the rectangle divided by the y dimension of the rectangle is always controlled by the constant K. As the graphical pointer means is moved to draw the rectangle the aspect ratio, the relationship between the x dimension and the y dimension of the rectangle is maintained to be the constant K. The aspect ratio of the drawn rectangle is maintained by drawing according the following two formulas: (1) If the pointer coordinate (Xp, Yp) is such that the ratio Xp/Yp> K, then the x dimension of the drawn rectangle is computed to be the absolute value of (Xp-X1), and the y dimension of the drawn rectangle is derived from the x dimension computation as the absolute value of (Xp-X1) divided by K; (2) If the pointer coordinate of the drawn rectangle (Xp, Yp) is such that the ratio Xp/Yp< K, then the y dimension of the drawn rectangle is computed to be the absolute value of (Yp-Y1), and the x dimension is derived from the y dimension computation as the absolute value of (Yp-Y1) x K. In the case where the ratio Xp/Yp>K, the x dimension of the drawn rectangle is the governing dimension of the drawn rectangle, and the y dimension is the derived dimension of the drawn rectangle in order to maintain the aspect ratio K. In the case where the ratio Xp/Yp<K, the y dimension of the drawn rectangle is the governing dimesnion of the drawn rectangle, and the x dimension is the derived dimension of the drawn rectangle in order to maintain the aspect ratio K. The dimension of each edge of the rectangle is continuously computed such that rectangule 15 maintains the aspect ratio K. Thus as graphical pointer means 11' moves further from initial point 22 the dimensions of of all the edges of the rectangle may change as computed by the above formulas and third edge 17 and fourth edge 21 are caused to move. The coordinate point (Xp, Yp) of the graphical pointer means lies on either third edge 17 or fourth edge 21 depending on which edge is a derived dimension of the drawn rectangle. The movements of the edges 17, 19, 18, and 21 of the drawn rectangle are such that the ratio of the x dimension to the y dimension of the drawn rectangle is always maintained with respect to the constant K.

Figure 3:
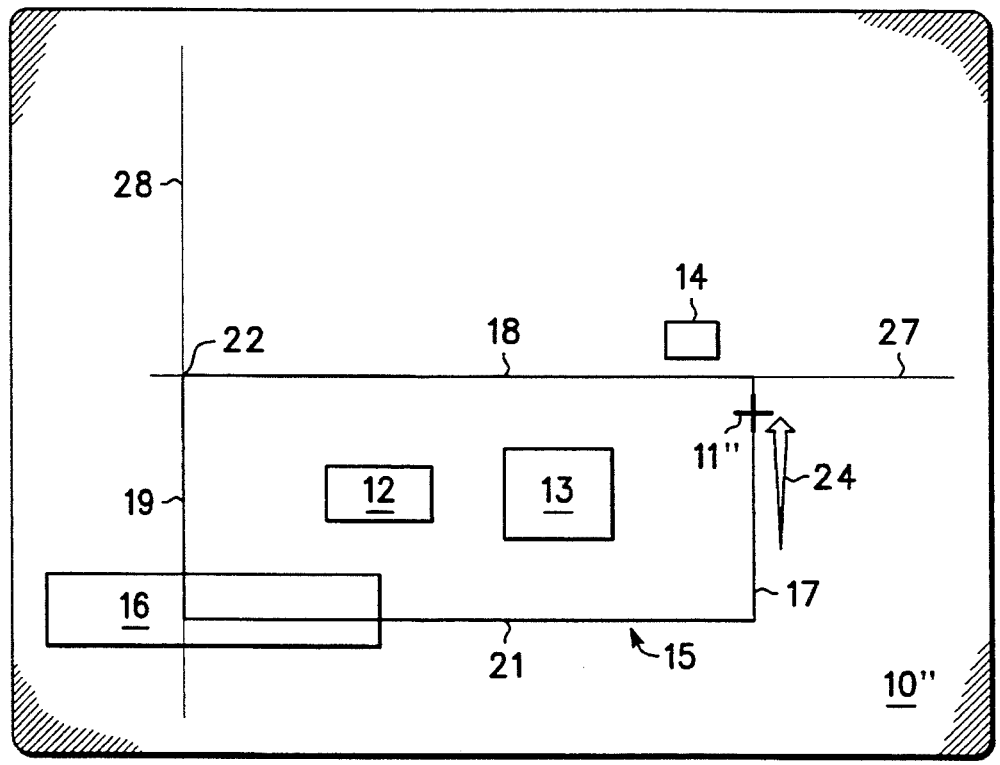
FIG. 3 shows the computer screen of FIG. 2 with the cursor moved in a vertical direction.

FIG. 3 shows a computer screen 10" after graphical pointer means 11' has been moved vertically to become graphical pointer means 11". An arrow 24 illustrates the movement of graphical pointer means 11' The coordinates (Xp, Yp) of the graphical pointer means locations 11' and 11" maintain the relationship Xp/Yp>K. Therefore, the x dimension of the drawn rectangle is the governing dimension and the y dimension is the derived dimension. Since the motion of graphical pointer means 11' is entirely in the y direction and does not cross the x axis there is no change in the size or position of rectangle 15.

Figure 4:
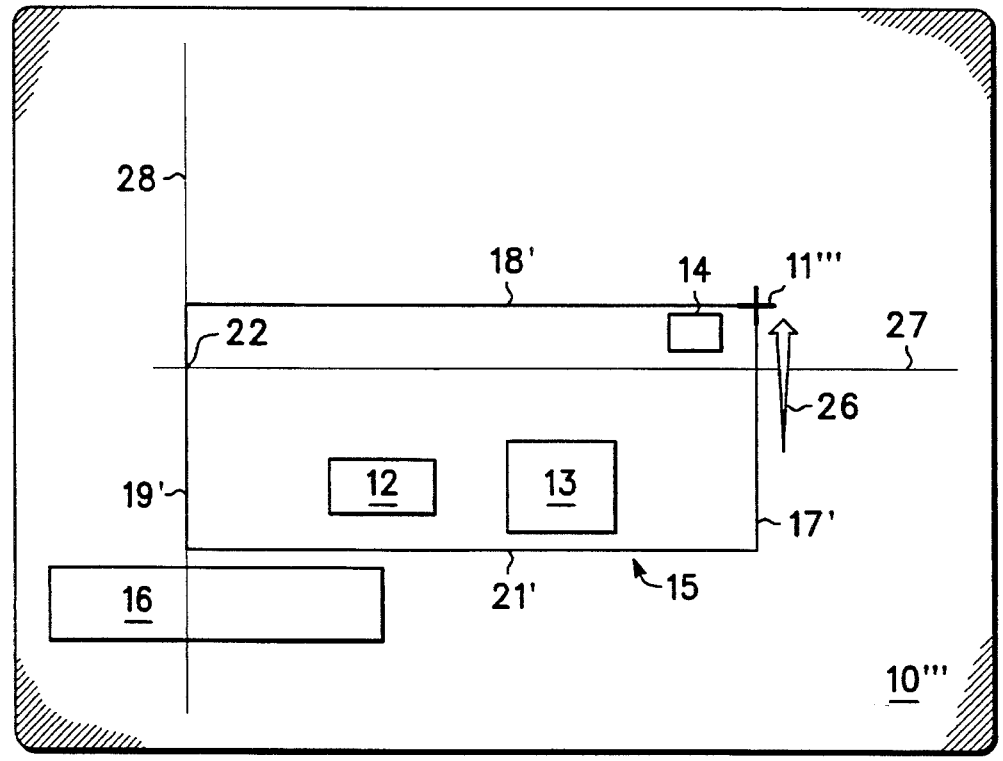
FIG. 4 shows the computer screen of FIG. 3 with the cursor moved vertically past the initial point.

FIG. 4 shows a computer screen 10''' after graphical pointer means 11" has moved vertically parallel to the y axis 28 past first, or x, axis 27, and the y axis value of the graphical pointer means has moved past Yp equal to zero, to become graphical pointer means 11'''. First edge 18 has been moved vertically to track graphical pointer means 11''' while fourth edge 21 has been moved vertically the same amount to become fourth edge 21'. The positions of second edge 19 and third edge 17 are also moved to maintain the shape of the rectangle. The size and aspect ratio of rectangle 15 is maintained since the ratio of Xp/Yp>K is maintained as the graphical pointer means is moved parallel to the y axis. An arrow 26 illustrates the vertical motion of graphical pointer means 11" to the position of graphical pointer means 11'''. Graphical object 12, 13, and 14 are now contained within rectangular box 15. Deactivating graphical pointer means 11''' at this point would cause graphical objects 12, 13 and 14 to be identified based on containment within rectangle 15. With one activation and one deactivation of the graphical pointer means the size of the drawn rectangle and its location with respect to the initial point has been established.

Figure 5:
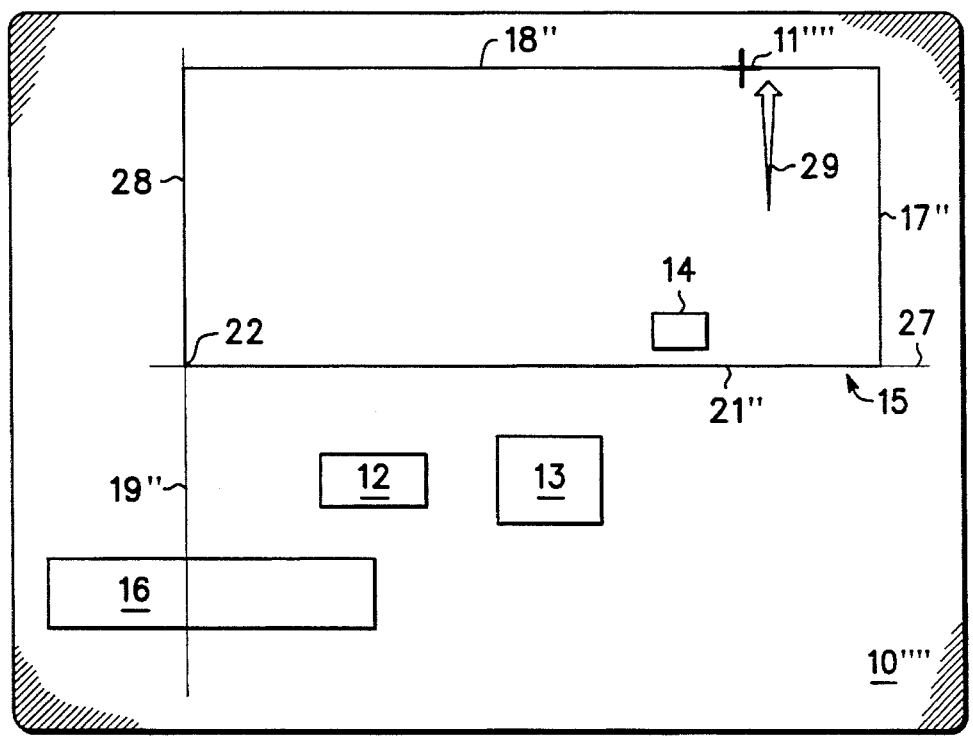
FIG. 5 shows the computer screen of FIG. 4 with the cursor moved further in vertical direction.
Figure 6:
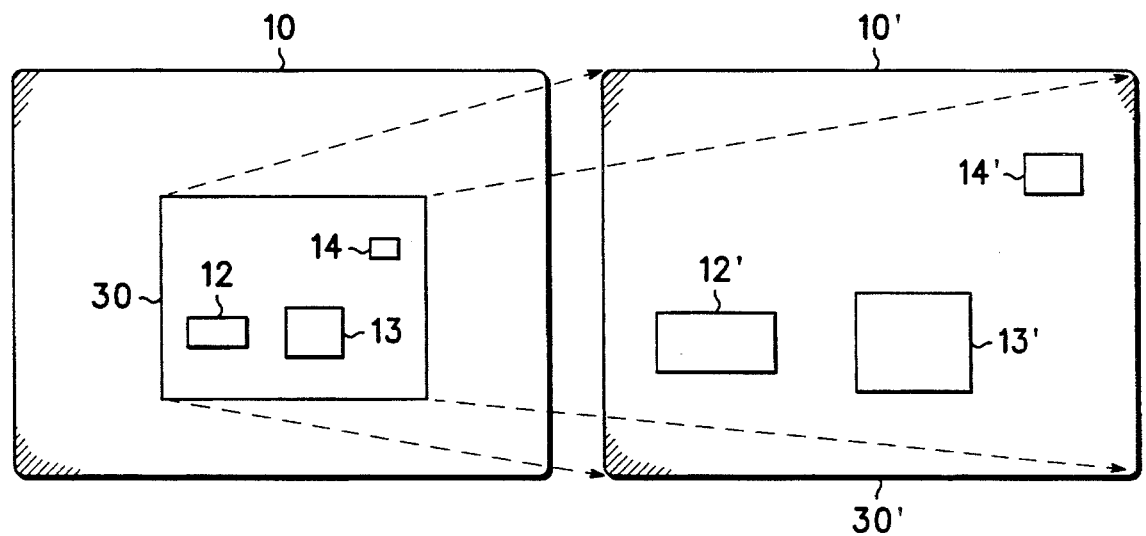

FIG. 5 shows a computer screen 10'''' after graphical pointer means 11''' has moved even further vertically, parallel to the y axis, to the position of graphical pointer means 11''''. In this instance, the ratio of the absolute value of Xp/Yp has become less than K, and the y dimension of the drawn rectangle becomes the governing dimension and the x dimension becomes the derived dimension of the drawn rectnagle. First edge 18' continues to track graphical pointer means 11'''' to become first edge 18", but fourth edge 21' is not permitted to move vertically beyond x axis 27 thus becoming fourth edge 21". The position of third edge 17' has been moved to first edge 17" and and second edge 19' has been moved to 19" so as to maintain the aspect ratio K of the drawn rectangle. Accordingly, rectangle 15 has been caused to both move in position and grow in size as a result of a single keystroke operation (one activation of the graphical pointer means). Deactivation of graphical pointer means 11"" at this point would result in only graphical object 14 being selected by containment.

Since movement of the graphical pointer means needs to define only one of the x or y dimensions of the drawn rectangle depending on the ratio of Xp/Yp, and the second dimension is then derived from the defined dimension by computation, moving the location of the drawn rectangle can also be accomplished with the same activation of the graphical pointer means. Prior art techniques must define both the x and y dimension of a drawn rectangle in the same activation of the graphical pointer means. Therefore, in the prior art, a second activation of the graphical pointer means is necessary to move the location of the drawn rectangle.

In the preferred embodiment, selected objects are then edited in some way, for example a group of cells within an integrated circuit may be moved to a new location within the integrated circuit. Another common function is to redraw computer screen 10 to show only the objects within the rectangle 15. Alternative embodiments include selection of objects based on making contact with the rectangle, non-containment or a predetermined distance from the rectangle.

By now it should be clear that the present invention provides a method for defining an area of a computer screen. The defined area is outlined as a rectangle which can both be moved as a rigid object and resized with a single operator input.

A portion of a typical computer program which implements an example of the preferred embodiment:

```
/*------------------------------------------------
**      AT_box          - defines and displays an Axis Tracking
**                        box
**
**This function is called whenever the user holds down
**a mouse button and moves the mouse
**
*/
void AT_box( data, event, aspect_ratio )
caddr_t data;
XEvent *event;
int aspect_ratio;
{
int x = event->xbutton.x,
    y = event->xbutton.y;

int t;
/*
** Redraw old box (redrawing an existing box with 'XorGC'
** graphics context actually removes the box from the
** screen)
*/
XDrawRectangle( display, XtWindow(drawing), XorGC,
        Rubtangle.x, Rubtangle.y, Rubtangle.width,
        Rubtangle.height);

/*
** Define the Axis Tracking box.
** Xm = X coordinate of inception point
** Ym = Y coordinate of inception point
**
*/
t = Xm - x;
Rubtangle.width = ABS( t );/* determined width
(current location to inception
point) */
```

-continued
```
t = Ym - y;
Rubtangle.width = ABS( t );/* determined height
(current location to inception
point) */
/*
** Aspect ratio of the box is fixed
**
*/
if ( LastButton == Button2 ) {
if ( (Rubtangle.width * aspect_ratio) >
Rubtangle.height )
Rubtangle.height = (Rubtangle.width * aspect_ratio);
else Rubtangle.width = (Rubtangle.height /
aspect_ratio);
}
/* Determine proper (x,y) location for box origin (upper
** left corner) so XDrawRectangle function draws the box
** correctly.
*/
if ( Xm >= x && Ym >= y ) {
Rubtangle.x = x;
Rubtangle.y = y;
} else if ( Xm >= x && Ym < y ) {
Rubtangle.x = x;
Rubtangle.y = Ym;
} else if ( Xm < x && Ym < y ) {
Rubtangle.x = Xm;
Rubtangle.y = Ym;
} else /*if ( Xm < x && Ym >= y ) /* {
Rubtangle.x = Xm;
Rubtangle.y = y;
}
/* Draw new box onto drawing window */
XDrawRectangle( display, XtWindow(drawing), XorGC,
        Rubtangle.x, Rubtangle.y, Rubtangle.width,
        Rubtangle.height);
} /* END AT_box */
```

We claim:

1. A method for drawing a rectangle with a preset aspect ratio on a computer driven graphical display having a graphical pointer means, said method comprising the steps of:

storing in the computer a number to preset the aspect ratio of the rectangle to be drawn;

activating the graphical pointer means at an initial point;

moving the graphical pointer means away from the initial point;

tracking the graphical pointer means by the computer with a first edge coincident to a first axis beginning at the initial point;

placing a second edge by the computer so as to meet the first edge at the initial point and coincident with a second axis;

placing a third edge by the computer parallel to the second axis so as to meet the first edge at the first axis;

placing a fourth edge by the computer parallel to the first axis and which joins the second edge to the third edge, the fourth edge being continuously positioned to define a rectangle;

determining by the computer a governing dimension of the rectangle and a derived dimension of the rectangle and maintaining a preset aspect ratio of the governing and derived dimensions of the rectangle;

moving the graphical pointer means along the derived dimension of the rectangle past an axis of the initial point so as to move the rectangle without altering the size or shape of the rectangle;

deactivating the graphical pointer means; and recording in the computer the area and location of the rectangle.

2. The method for drawing a rectangle with a preset aspect ratio on a computer driven graphical display having the graphical pointer means of claim 1, further comprising:

altering the scale of the computer driven graphical display, such that the rectangle fills the entire computer driven graphical display.

3. The method for a rectangle with a preset aspect ratio on a computer driven graphical display having the graphical pointer means of claim 1, further comprising:

representing the size and shape of a plurality of physical objects by using a plurality of graphical objects shown on the computer driven graphical display;

selecting a group of desired physical objects based on containment within the rectangle; and modifying the group of desired physical objects.

4. The method for drawing a rectangle with a preset aspect ratio on a computer driven graphical display having the graphical pointer means of claim 1, wherein the physical objects comprise a plurality of cells within an integrated circuit.

5. A method for drawing a rectangle with a preset aspect ratio on a computer driven graphical display, said method comprising:

providing a plurality of graphical objects which appear on the computer driven graphical display;

providing a graphical pointer means;

storing in the computer a number to preset the aspect ratio of the rectangle to be drawn;

activating the graphical pointer means at an initial point;

moving the graphical pointer means from the initial point;

defining a rectangle with the graphical pointer means having a first edge coincident to a first axis of the initial point, a second edge coincident to a second axis of the initial point and meeting the first edge at the initial point, a third edge parallel to the second edge and meeting the first edge at the first axis, and a fourth edgeparallel to the first edge joining the second edge to the third edge;

determining by the computer according to the location of the graphical pointer means a governing dimension and a derived dimension of the rectangle to maintain the preset aspect ratio;

moving the graphical pointer means along an edge of the derived dimension of the rectangle towards and past an axis of the initial point;

tracking the graphical pointer means by moving the edges of the rectangle without altering the size and aspect ratio of the rectangle such that the rectangle completely surrounds a desired graphical object;

deactivating the graphical pointer means; and identifying the desired graphical object based on containment of the graphical object within the rectangle.

6. A method for drawing a rectangle with a preset aspect ratio on a computer driven graphical display, said method comprising:

depicting a plurality of cells within an integrated circuit by a plurality of graphical objects shown on the computer driven graphical display;

providing a graphical pointer means which is shown on the computer driven graphical display;

storing in the computer a number to preset the aspect ratio of the rectnagle to be drawn;

activating the graphical pointer means at an initial point;

moving the graphical pointer means from the initial point;

continuously showing a rectangle on the computer driven graphical display and determining a governing dimension and a derived dimension of the rectangle by comparing the ratio of the x coordinate location divided by the y coordinate location of the graphical pointer means to the preset aspect ratio; the dimensions and size of the rectangle are maintained with the moving graphical pointer means;

moving the graphical pointer means along the derived dimension of the rectangle to move the rectangle without changing its size or shape;

deactivating the graphical pointer means;

identifying by the computer a desired graphical object based on containment of the graphical objects within the rectangle; and modifying the cell which is represented by the desired graphical object.

* * * * *

UNITED STATES PATENT AND TRADEMARK OFFICE
CERTIFICATE OF CORRECTION

PATENT NO.    : 5,467,451
DATED         : November 14, 1995
INVENTOR(S)   : Joseph J. Burkis et al.

It is certified that error appears in the above-indentified patent and that said Letters Patent is hereby corrected as shown below:

In Claim 3, column 6, line 7, after "for" insert --drawing--.

In Claim 5, column 6, line 37 delete "edgeparallel", insert --edge parellel.
In Claim 6, column 6, line 62, delete "rectnagle" and insert --rectangle-- therefor.

Signed and Sealed this

Twenty-eighth Day of October, 1997

Attest:

BRUCE LEHMAN

Attesting Officer                Commissioner of Patents and Trademarks